United States Patent [19]

Blunck et al.

[11] Patent Number: 4,585,574
[45] Date of Patent: Apr. 29, 1986

[54] ANTHRAQUINONE DYESTUFFS, PROCESSES FOR THEIR PREPARATION, THEIR USE, AND LIQUID-CRYSTALLINE MATERIALS CONTAINING ANTHRAQUINONE DYESTUFFS

[75] Inventors: Martin Blunck, Cologne; Uwer Claussen; Rütger Neeff, both of Leverkusen, all of Fed. Rep. of Germany

[73] Assignee: Bayer Aktiengesellschaft, Leverkusen, Fed. Rep. of Germany

[21] Appl. No.: 324,919

[22] Filed: Nov. 25, 1981

[30] Foreign Application Priority Data

Dec. 12, 1980 [DE] Fed. Rep. of Germany ....... 3046904

[51] Int. Cl.⁴ .......................... C09K 3/34; C09B 1/20; C09B 1/54; C09B 1/58
[52] U.S. Cl. .................. 252/299.1; 260/371; 260/372; 260/373; 260/374; 260/377; 260/378; 260/380; 260/381; 350/349; 548/146; 548/156; 548/160; 548/194; 548/187; 549/472; 549/480
[58] Field of Search ............... 350/349; 252/299.1; 260/371, 372, 373, 374, 377, 378, 380, 381; 548/194, 156, 160, 146; 549/472, 480

[56] References Cited

U.S. PATENT DOCUMENTS

| 4,358,392 | 11/1982 | Cagnard et al. | 252/299.1 |
|---|---|---|---|
| 4,360,447 | 11/1982 | Morimaka et al. | 252/299.1 |
| 4,363,743 | 12/1982 | Moeller et al. | 252/299.1 |
| 4,376,715 | 3/1983 | Cognard et al. | 252/299.1 |
| 4,402,854 | 9/1983 | Moeller et al. | 252/299.1 |
| 4,428,858 | 1/1984 | Cognard et al. | 252/299.1 |
| 4,491,532 | 1/1985 | Scherowsky et al. | 252/299.1 |
| 4,495,083 | 1/1985 | Imazeki et al. | 252/299.1 |
| 4,505,549 | 3/1985 | Shimiozu et al. | 252/299.1 |

FOREIGN PATENT DOCUMENTS

| 2104 | 5/1979 | European Pat. Off. | 252/299.1 |
|---|---|---|---|
| 26004 | 4/1981 | European Pat. Off. | 252/299.1 |
| 38460 | 10/1981 | European Pat. Off. | 252/299.1 |
| 48886 | 4/1982 | European Pat. Off. | 252/299.1 |
| 48887 | 4/1982 | European Pat. Off. | 252/299.1 |
| 75173 | 3/1983 | European Pat. Off. | 252/299.1 |
| 93367 | 11/1983 | European Pat. Off. | 252/299.1 |
| 2920730 | 11/1979 | Fed. Rep. of Germany | 252/299.1 |
| 3036853 | 4/1981 | Fed. Rep. of Germany | 252/299.1 |
| 3038372 | 5/1981 | Fed. Rep. of Germany | 252/299.1 |
| 2086409 | 5/1982 | Fed. Rep. of Germany | 252/299.1 |
| 41-3515 | 3/1967 | Japan | 252/299.1 |
| 57-90081 | 6/1982 | Japan | 252/299.1 |
| 57-198777 | 12/1982 | Japan | 252/299.61 |
| 2037803 | 7/1980 | United Kingdom | 252/299.1 |
| 2074182 | 12/1981 | United Kingdom | 252/299.1 |
| 2081736 | 2/1982 | United Kingdom | 252/299.1 |
| 2091283 | 7/1982 | United Kingdom | 252/299.1 |

OTHER PUBLICATIONS

Cognard, J., et al., Mol. Cryst. Liq. Cryst., vol. 70, pp. 1–19 (1981).
Abstracts of the Eighth International Liq. Cryst. Conf., I-23 & I-24, Distributed in Kyoto, Japan, Jun. 30–Jul. 4, 1980.

Primary Examiner—Teddy S. Gron
Attorney, Agent, or Firm—Sprung Horn Kramer & Woods

[57] ABSTRACT

Anthraquinone dyestuffs of the formula

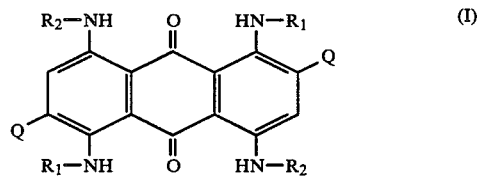

in which
$R_1$ and $R_2$ denote hydrogen, alkyl, cycloalkyl, aryl or aralkyl, and the said hydrocarbon radicals can be substituted, and
Q denotes an aryl radical or heterocyclic radical or an —OR′, —SR′, —CH=N—R′,

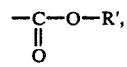

—CHO or —SO₂—O—R′ radical,
wherein
R′ represents an aryl, aralkyl or heterocyclic radical, and the radicals mentioned for R′ can be substituted,
processes for their preparation, and liquid-crystalline materials containing anthraquinone dyestuffs.

22 Claims, No Drawings

ANTHRAQUINONE DYESTUFFS, PROCESSES FOR THEIR PREPARATION, THEIR USE, AND LIQUID-CRYSTALLINE MATERIALS CONTAINING ANTHRAQUINONE DYESTUFFS

The invention relates to novel anthraquinone dyestuffs of the formula

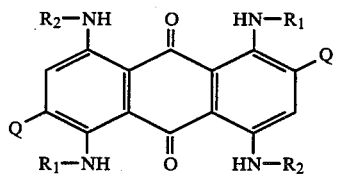   (I)

to processes for their preparation, to their use for dyeing, and to liquid-crystalline materials containing these anthraquinone dyestuffs.

In formula (I)

$R_1$ and $R_2$ denote hydrogen, alkyl, cycloalkyl, aryl or aralkyl, and the said hydrocarbon radicals can be substituted, and Q denotes an aryl radical or heterocyclic radical or an $-O-R'$, $-S-R'$, $-CH=N-R'$,

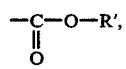

—CHO or $-SO_2-O-R'$ radical,
wherein
R' represents an aryl, aralkyl or heterocyclic radical, and the radicals mentioned for R' can be substituted;
the compound in which $R_1$ and $R_2$ denote hydrogen and Q at the same time denotes phenoxy being excepted.

The individual substituents have, for example, the following meanings:

$R_1$ and $R_2$: hydrogen, $C_1-C_6$-alkyl, $C_3-C_7$-cycloalkyl and optionally $C_1-C_4$-alkyl-, cyclohexyl-, $C_1-C_4$-alkoxy- and ($C_1-C_4$-alkyl)-carbonyl-substituted phenyl, naphthyl, benzyl and phenethyl.

Q: phenyl, naphthyl and thienyl, which can be substituted by, for example, hydroxyl, halogen, preferably chlorine, $C_1-C_4$-alkoxy, $C_1-C_4$-alkyl, phenoxy, $C_1-C_4$-alkoxy-$C_1-C_4$-alkoxy, chloro-$C_1-C_4$-alkoxy, $C_1-C_4$-alkylthio, $C_1-C_4$-alkoxy-$C_1-C_4$-alkylthio, chloro-$C_1-C_4$-alkylthio, ($C_1-C_4$-alkoxy)-carbonyloxy, benzyloxy, benzylcarbonyloxy, phenyl, benzyl and cyclohexyl.

R': phenyl which can be substituted by $C_1-C_{10}$-alkyl, preferably $C_1-C_4$-alkyl, $C_1-C_6$-alkoxy, cyclohexyl, halogen, preferably chlorine and bromine, cyano-$C_1-C_4$-alkyl, $C_1-C_4$-alkylthio, phenoxy, phenylthio, hydroxyl, cyano, mono- and di-$C_1-C_4$-alkylamino, phenylamino, mono- and di-$C_1-C_4$-alkylaminosulphonyl, phenylaminosulphonyl and hydroxyphenylaminosulphonyl; formyl; naphthyl; benzyl; phenethyl; a 5-membered or 6-membered heterocyclic ring, containing one to three hetero-atoms from the series comprising O, N and S, which ring can be substituted, for example, by $C_1-C_4$-alkyl or phenyl, and to which ring one or two benzene rings can be fused.

Preferred dyestuffs correspond to the formula

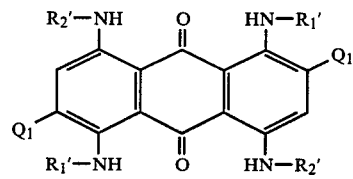   (II)

in which
$R_1'$ and $R_2'$ denote hydrogen, alkyl or aryl and
$Q_1$ denotes optionally substituted phenyl, $-OR'$, $-SR'$, $-CH=N-R'$,

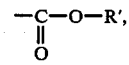

—CHO or $-SO_2-O-R'$, R' having the meanings given in connection with formula (I).

Particularly preferentially, $R_1'$ and $R_2'$ represent hydrogen, $C_1-C_4$-alkyl, or optionally cyclohexyl-, $C_1-C_4$-alkyl-, $C_1-C_4$-alkoxy-, ($C_1-C_4$-alkoxy)-carbonyl- and ($C_1-C_4$-alkyl)-carbonyl-substituted phenyl, with the exception of the compound in which $R_1'$ and $R_2'$ denote hydrogen and Q at the same time denotes phenoxy.

Further preferred dyestuffs of the formula (II) are those
in which
$R_1'$ and/or $R_2'$ denote hydrogen,
with the exception of the compound in which $R_1'$ and $R_2'$ denote hydrogen and Q at the same time denotes phenoxy.

Further preferred dyestuffs are those of the formula

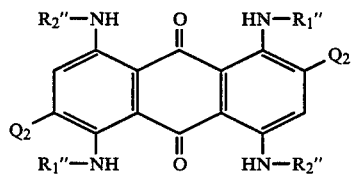   (III)

in which
$R_1''$ and $R_2''$ denote hydrogen, 4-cyclohexylphenyl, 4-methylphenyl, dimethylphenyl, ethylphenyl, 4-methoxyphenyl, 2,6-diethoxy-4-methylphenyl, 4-ethoxycarbonyl-phenyl and
$Q_2$ denotes phenyl, 4-methoxyphenyl, formyl, phenoxycarbonyl, phenoxy, 2-chlorophenoxy, 4-methylphenoxy, 2-ethoxyphenoxy, 4-methoxyphenoxy, 4-(β-cyanoethyl)-phenoxy, 3-chlorophenoxy, 4-phenylphenoxy, 3-methylphenoxy, 4-chlorophenoxy, p-(2-phenyl-prop-2-yl)-phenoxy, 2-methylphenoxy, 2-methoxyphenoxy, 4-methylthiophenoxy, 4-t.-butylphenoxy, 3-methoxyphenoxy, 4-(4'-hydroxyphenylaminosulphonyl)-phenoxy, 2-ethylphenoxy, 4-hydroxyphenoxy, 3-cyanophenoxy, 4-phenylthiophenoxy, 1,1,3,3-tetramethylbut-1-yl-phenoxy, 4-cyclohexylphenoxy, 4-phenylaminosulphonyl-phenoxy, 2-chlorophenoxysulphonyl, 1-naphthyloxy, phenoxycarbonyl, phenethyloxy, N-(4-methylphenyl)-formimidoyl, N-(dibenzofuran-2-yl)-formimidoyl, N-(4-cyclohexylphenyl)-formimidoyl, N-(4-phenylamino-phenyl)-formimidoyl, N-(4-phenylthiazol-2-yl)-formimidoyl and N-(4-methoxyphenyl)-formimidoyl with the exception of the compound in which $R_1''$ and $R_2''$ denote hydrogen and Q at the same time denotes phenoxy.

Moreover, preferred dyestuffs are those of the formula

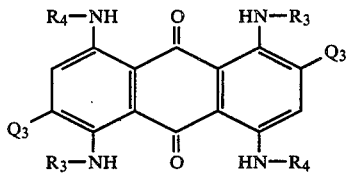
(IV)

in which $R_3$ and $R_4$ denote hydrogen, optionally $C_1$–$C_4$-alkyl- or cyclohexyl-substituted phenyl or cyclohexyl and $Q_3$ represents phenoxy or phenylthio, which can be substituted by $C_1$–$C_8$-alkyl, cyclohexyl, $C_1$–$C_4$-alkoxy, hydroxy-$C_1$–$C_4$-alkoxy, chlorine, and bromine, or a formimidoyl radical which is optionally N-substituted by phenyl, $C_1$–$C_8$-alkylphenyl, cyclohexyl, $C_1$–$C_4$-alkoxyphenyl and (hydroxy-$C_1$–$C_4$-alkoxy)-phenyl, or represents a benzthiazolyl radical, with the exception of the compound in which $R_3$ and $R_4$ denote hydrogen and $Q_3$ at the same time denotes phenoxy.

The novel dyestuffs are prepared according to processes known per se (see, for example, Houben-Weyl, Volume 7/3c, pages 144–147, pages 171–181, pages 198–199 and pages 244–245).

To introduce the amino groups, the broadly applicable method of replacing substituents in the α-positions of the anthraquinone is employed. Halogen exchange is preferred, and generally feasible methods are reactions with aromatic amines in excess or in nitrobenzene solution, in the presence of weakly basic salts and of catalytically active copper compounds, or exchange with arylsulphonamides and subsequent saponification.

In this way, tetrasubstituted anthraquinones are obtained, in which the α-positions are substituted either identically or pair-wise in the 1,5- and 4,8-position, depending on the choice of starting materials and amines.

A particularly useful starting material is 1,5-diamino-2,4,6,8-tetrabromoanthraquinone. The substituents in the β-positions are also introduced by exchange. Suitable leaving groups are halogen atoms or the $SO_3H$ radical, the treatment with the nucleophilic reagents being carried out at elevated temperature. Alcoholates, phenolates or thiolates are preferred, and, if desired, Cu-II salts can be used to facilitate the exchange. The reaction can be carried out in the presence of organic high-boiling polar solvents, such as DMF, nitrobenzene or alcohols, but in suitable cases an excess of the reagent can also be used as the solvent.

The 2,6-disulphonic acid esters can be prepared by the known processes, for example by reacting the acid chlorides with alcoholates or phenolates.

Compounds of the formula

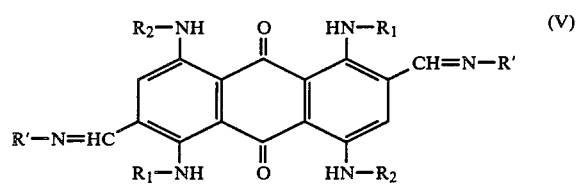
(V)

in which $R_1$, $R_2$ and $R'$ have the abovementioned meaning, are obtainable via a double Marschalk reaction (Houben-Weyl, Volume 7/3c, pages 188–199). Starting from the diamino compound (VI), the diaminodimethyl compound (VII) is first prepared, and this is then nitrated in the free α-positions. The nitro groups are either reduced direct or subjected to exchange with amines (Houben-Weyl, Volume 7/3c, pages 183–185).

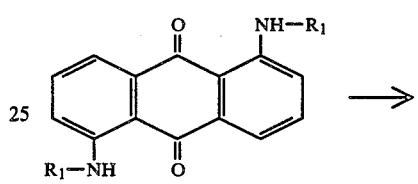
(VI)

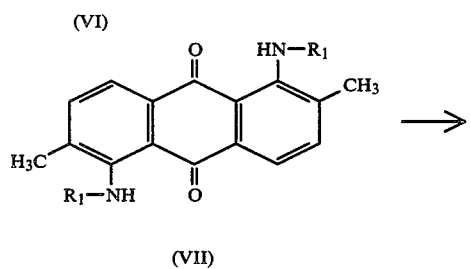
(VII)

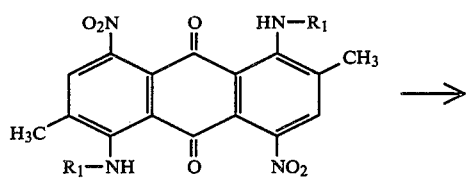
(VII)

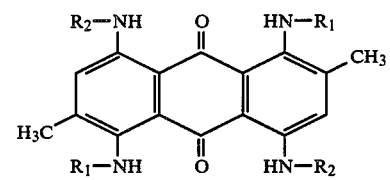
(IX)

The bis-aldehyde is obtained by saponifying the tetra-α-substituted 2,6-bis-anil of anthraquinone. This compound is formed on oxidation with, for example, nitrobenzene in the presence of a weak alkali and of aniline. The reaction of the 2,6-diformyl-tetraamine-substituted anthraquinone to give the Schiff bases is carried out by adding the amines to a solution of the aldehyde, in accordance with processes known from the literature.

The novel compounds can be purified in the usual manner.

Chromatographic purification processes, such as column chromatography over silica gel, have proved particularly suitable. The novel dyesuffs are suitable for dyeing textile materials, preferably polyester-based materials, or for mass coloring of plastics, such as, for example, polystyrene, polyvinyl chloride, polycarbonate and others. A preferred use is, however, in liquid-crystalline materials. Accordingly, the invention also relates to liquid-crystalline materials which contain anthraquinone dyestuffs of the formula (I). The liquid-crystalline material preferably has positive dielectric anisotropy and can be employed in opto-electronic display devices.

Opto-electronic display elements as a rule consist of 2 glass plates arranged parallel to one another (a distance of 5–50μ apart). Electrodes are attached to their inner faces, between which the liquid-crystalline material is embedded. The ability of an opto-electronic display to function is based on the oriented structure of the liquid crystals, which can be changed by the electrical field applied.

The oriented structure of the liquid-crystalline materials can communicate itself to suitable dyestuffs, so that these participate as "guests" in the structure. This phenomena has therefore also been described as a host-guest interaction [Heilmeier, Castellano and Zanoni: Mol. Crystals a. Liquid Cryst., (8) 293–304 1969].

The degree of this interaction can be expressed in terms of the mean deviation of the geometrical axis of the dyestuff molecules from the prepared direction predetermined by the molecules of the liquid-crystalline material. It is possible to define a degree of order S, which takes the mean deviation into account and assumes a value of 1.0 for perfect order. In practice, this value is not reached; rather, the S-values are always <1.0. The values mentioned in the literature are not directly comparable, because of different techniques of measurement. The definition of the degree of order, and its importance, is described by D. L. White and G. N. Taylor: J. Appl Phys (5) 4718–23 1974 or, for example, in European Published Application No. 2,104.

Dyestuffs with a high degree of order are particularly valuable for industrial use. However, they must have a series of other properties. The dyestuff must be free from any charge. If it were not so, it would migrate in the electrical field between the electrodes. The photochemical stability must be very good and the shade must neither change nor become bleached in light. Furthermore, good chemical stability in the liquid-crystalline medium, which has a complex composition, is demanded. Finally, the dyestuff must have good solubility and must not crystallise, even at sustained low temperatures.

It is obvious that there are not many compounds which satisfactorily meet the requirement for all of these properties. A necessary precondition for the usefulness of the dyestuffs is the dichroism of the light absorption as a function of the orientation of the host liquid crystals.

The literature gives numerous indications of structural preconditions of suitable dyestuffs, as far as their pleochroic property is concerned. Thus, a long axis and a rod-shaped, planar and symmetrical structure are always regarded as a precondition (F. Jones and T. J. Reeve: J. Soc. Dyers Col. 1979 352–359; J. Constant et al.: J. Phys. D: Appl. Phys. (11) 479 1978).

Dyestuffs of the formula

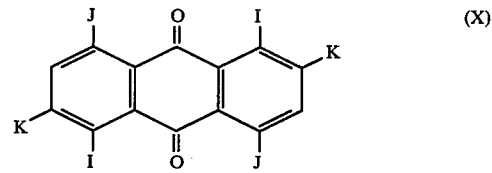

are particularly preferred for use in liquid-crystalline materials. The substituents I, J and K are selected as follows:

The degree of order S should be >0.74 and be calculated from the formula $$S = \frac{e^y \times 0.85}{1 + e^y} \quad (A)$$

taking a base value of 0.95 for the case where I=J=K=hydrogen. To this base value, the increments mentioned in the tables which follow are added, taking into account the sign. The thus determined value y is inserted in formula (A), from which, using the limiting condition S>0.74, the amount of the particularly preferred compounds is deduced.

The substituents I and J can have the following meanings:

| | | Increment |
|---|---|---|
| —NH—⟨C₆H₄⟩—C(=O)OX | with X = n-$C_1$-$C_4$—alkyl | 0.05 |
| —NH—⟨C₆H₄(X₁)(X₂)⟩—X | with X = n-$C_1$-$C_4$—alkyl and $X_1 = X_2 =$ H | −0.18 |
| | with X = $X_1$ = n-$C_1$-$C_4$—alkyl and $X_2 =$ H | −0.26 |
| | with X = branched $C_1$-$C_4$—alkyl and $X_1 = X_2 =$ H | −0.26 |
| —NH₂ | | 0.24 |
| —HN—⟨C₆H₄⟩—⟨C₆H₁₀⟩—H | | 0.24 |
| —HN—⟨C₆H₄⟩—OR | with R = n-$C_1$-$C_4$—alkyl | −0.20 |
| —HN—R | with R = n-$C_1$-$C_4$—alkyl | −0.26 |
| | with R = branched $C_1$-$C_4$—alkyl | −0.31 |

The substituents K can have the following meaning, with X always denoting n—$C_1$-$C_4$-alkyl in the substituents shown below.

|  | Increment |
|---|---|
| 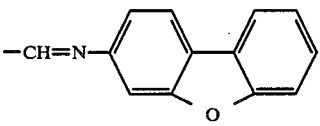 | 0.64 |
| 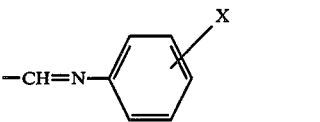 | 0.65 |
| 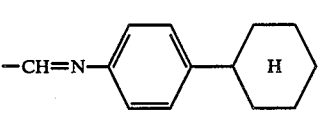 | 0.56 |
| 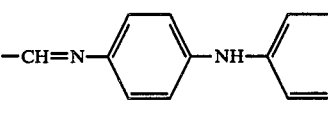 | 0.40 |
| 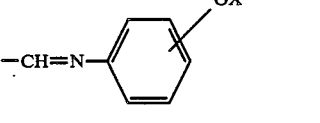 | 0.28 |
| 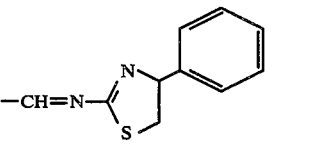 | 0.32 |
| 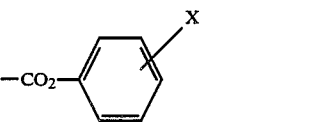 | 0.08 |
| 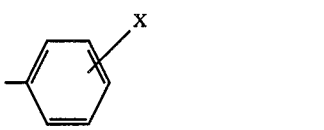 | 0.44 |
| 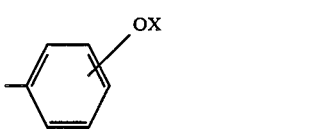 | 0.36 |
| 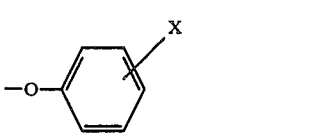 | 0.36 |
| 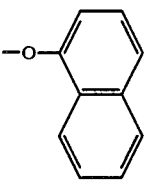 | 0.20 |

-continued

|  | Increment |
|---|---|
|  | 0.16 |
| —CHO | 0.20 |

To achieve a high degree of order, it is necessary to free the dyestuffs from colored concomitant substances. This is best done by chromatographic techniques, especially by column chromatography. The pure compounds, when dissolved in liquid-crystalline materials, give red to blue shades. They are characterized by a high degree of order, very good light fastness and good chemical resistance. They have good solubility.

The liquid-crystalline material can be chosen at will, but must be able to take up a sufficient amount of the dyestuff according to the invention. The concentration is sufficient if an 0.1–10% strength solution, preferably an 0.5–2% strength solution, in the liquid-crystalline material can be prepared.

Of the various states of order of liquid-crystalline materials, the nematic and cholesteric states, corresponding to the definitions given, for example, by R. Steinsträsser and L. Pohl, Angew. Chem. 85, 706 (1973), are preferred.

In the absence of a field, two orientations of the liquid-crystalline material can be distinguished, which depend on the property of the phase boundary and accordingly on the pretreatment of the glass plates. Depending on whether the long axis of the molecules constituting the liquid-crystalline phase is vertical or horizontal relative to the plate surface, the texture is described as homeotropic or homogeneous. The techniques for producing suitable surfaces are known (Ullmann, Volume XI, page 657 et seq.). The dielectric anisotropy depends on the dipole properties of the liquid-crystalline compounds. It is positive if the electrical field produces a homeotropic orientation and negative if the orientation becomes homogeneous. The use of the dyestuffs according to the invention in liquid-crystalline materials with positive dielectric anisotropy is preferred. Examples of suitable liquid-crystalline materials are mixtures of alkylcyano-biphenyls, alkoxycyano-biphenyls, alkylcyano-terphenyls, phenylcyclohexane, bicyclohexyls, azoxy compounds, Schiff bases, phenyl benzoates, phenyl thiobenzoates and terpyrimidines. A mixture of 51% of 4'-n-pentyl-4-cyano-biphenyl, 25% of 4'-n-heptyl-4-cyano-biphenyl, 16% of 4'-n-octyl-4-cyano-biphenyl and 8% of 4''-n-pentyl-4-cyano-terphenyl, and a mixture of about 24% of trans-4-heptyl-(4-cyanophenyl)-cyclohexane, 37% of trans-4-pentyl-(4-cyanophenyl)-cyclohexane, 26% of trans-4-propyl-(4-cyanophenyl)-cyclohexane and 12% of trans-4-pentyl-(4'-cyano-biphenyl)-cyclohexane should be singled out particularly. In addition to the liquid-crystalline compounds and the dyestuff, the liquid-crystalline material can contain other customary additives, for example optically active compounds which can convert a nematic phase to a cholesteric phase, or substances to lower the threshold voltage, and the like.

EXAMPLE 1a 30 g of phenol are distilled from a mixture of 160 g of phenol and 15 g of potassium carbonate, 20 g of 1,5-diamino-2,6-dibromo-4,8-(p-tosylamino)-anthraquinone are added at 120°–130° C., and the mixture is heated for 14 hours at 160°–170° C. When it has cooled to 100° C., the dyestuff is precipitated by adding methanol. The dyestuff, which crystallises in attractive blue needles, is then filtered off, washed with methanol and water and dried, giving 15.95 g=77% of theory of 1,5-diamino-2,6-diphenoxy-4,8-di-(p-tosylamino)-anthraquinone.

EXAMPLE 1b 8 g of the dyestuff mentioned in Example 1a are stirred with 50 ml of concentrated sulphuric acid for 1 hour at 30° C. and the mixture is then slowly diluted with 50 ml of water, at 15°–20° C. The dyestuff-sulphate, which crystallises in prisms, is filtered off, washed with dilute sulphuric acid and extracted by stirring with water, containing added ammonia, at 90° C. After filtering off the product, and drying it, 3.81 g=80% of theory of 1,4,5,8-tetraamino-2,6-diphenoxy-anthraquinone, which has crystallized in blue prisms, are obtained. In the nematic phase, consisting of a mixture of about 24% of trans-4-heptyl-(4-cyanophenyl)-cyclohexane, 37% of trans-4-pentyl-(4-cyanophenyl)-cyclohexane, 26% of trans-4-propyl-(4-cyanophenyl)-cyclohexane and 12% of trans-4-pentyl-(4'-cyanobiphenyl)-cyclohexane, the dyestuff shows a degree of order S of 0.80.

If, in Example 1a, appropriately substituted phenols are used in place of phenol, the dyestuffs shown in the table are obtained on proceeding analogously to Example 1b:

| Example | Dyestuff | Degree of order S |
|---|---|---|
| 2 | 1,4,5,8-Tetraamino-2,6-(3-methyl-phenoxy)-anthraquinone | 0.81 |
| 3 | 1,4,5,8-Tetraamino-2,6-(4-tert.-butyl-phenoxy)-anthraquinone | 0.80 |
| 4 | 1,4,5,8-Tetraamino-2,6-(4-isooctyl-phenoxy)-anthraquinone | 0.77 |
| 5 | 1,4,5,8-Tetraamino-2,6-(4-cyclohexyl-phenoxy)-anthraquinone | 0.77 |
| 6 | 1,4,5,8-Tetraamino-2,6-(2-methoxy-phenoxy)-anthraquinone | 0.80 |
| 7 | 1,4,5,8-Tetraamino-2,6-(4-n-butoxy-phenoxy)-anthraquinone | 0.80 |
| 8 | 1,4,5,8-Tetraamino-2,6-(4-β-hydroxy-ethoxyphenoxy)-anthraquinone | 0.79 |
| 9 | 1,4,5,8-Tetraamino-2,6-(4-chloro-phenoxy)-anthraquinone | 0.80 |
| 10 | 1,4,5,8-Tetraamino-2,6-(3-bromo-phenoxy)-anthraquinone | 0.81 |

EXAMPLE 11

20 g of 1,4,5,8-tetra-(4-cyclohexylphenylamino)-2,6-dibromo-anthraquinone are introduced into a mixture, dried by distillation, of 150 g of phenol and 15 g of potassium carbonate at 120°–130° C. and the mixture is heated to 170°–175° until the formation of the novel dyestuff has ended, according to thin layer chromatography. After having added methanol and cooled the mixture, the dyestuff, which has crystallized out in blue prisms, is filtered off, washed with methanol and water and dried, giving 21.2 g=71% of theory of 1,4,5,8-tetra-(4-cyclohexylphenylamino)-2,6-diphenoxy-anthraquinone, which in the same nematic phase as described in Example 1b exhibits a degree of order S of 0.77.

If, in Example 11, the appropriate substituted phenols are used in place of phenol, the dyestuffs shown in the table are obtained analogously:

| Example | Dyestuff | Degree of order S |
|---|---|---|
| 12 | 1,4,5,8-Tetra-(4-cyclohexylphenyl-amino)-2,6-di-(4-methylphenoxy-anthraquinone) | 0.81 |
| 13 | 1,4,5,8-Tetra-(4-cyclohexylphenyl-amino)-2,6-di-(4-tert.-butyl-phenoxy)-anthraquinone | 0.80 |
| 14 | 1,4,5,8-Tetra-(4-cyclohexylphenyl-amino)-2,6-di-(3-methoxyphenoxy)-anthraquinone | 0.80 |

EXAMPLE 15

On proceeding analogously to Example 11, using 20 g of 1,5-di-(p-toluidino)-4,8-di-(4-cyclohexyl-phenylamino)-2,6-dibromo-anthraquinone in a mixture of 150 g of phenol and 15 g of potassium carbonate, 14 g=68% of theory of 1,5-di-(p-toluidino)-4,8-di-(p-cyclohexylphenylamino)-2,6-diphenoxy-anthraquinone, which crystallises in blue prisms, are obtained; in the same nematic phase as in Example 1b, this dyestuff exhibits a degree of order S of 0.74.

If, in Example 15, the appropriate substituted phenols are used in place of phenol, the dyestuffs shown in the table are obtained analogously:

| Example | Dyestuff | Degree of order S |
|---|---|---|
| 16 | 1,5-Di-(p-toluidino)-4,8-di-(4-cyclohexylphenylamino)-2,6-di-(4-tert.-butylphenoxy)-anthraquinone | 0.75 |
| 17 | 1,5-Di-(p-toluidino)-4,8-di-(4-cyclohexylphenylamino)-2,6-di-(4-n-propoxyphenoxy)-anthraquinone | 0.75 |
| 18 | 1,5-Di-(p-toluidino)-4,8-(cyclo-hexylphenylamino)-2,6-di-(2-chloroxy)-anthraquinone | 0.77 |

EXAMPLE 19a

A paste of 22 g of 1,5-diamino-anthraquinone in 1,500 ml of water and 65 ml of 45% strength sodium hydroxide solution is vatted with 45 g of sodium dithionite at 40° C. 22 ml of 37% strength formaldehyde are then added, the mixture is heated to 70°–80° C. in about 30 minutes, and the vat is flushed with air. The product which has precipitated is filtered off hot and dried, giving 23.4 g=95% of theory of crude 1,5-diamino-2,6-dimethyl-anthraquinone, which can be purified by recrystallization from a solvent, such as aniline or o-dichlorobenzene.

EXAMPLE 19b 100 g of 1,5-diamino-2,6-dimethyl-anthraquinone are dissolved in 500 ml of sulphuric acid monohydrate and 53 ml of 20% strength oleum and 40 g of paraformaldehyde are added at 10°–15° C. The mixture is stirred for a further hour, after which a mixture of 53.5 g of nitric acid and 108.5 g of sulphuric acid is added at 0°–5° C. and stirring is continued until the dinitration has ended, according to thin layer chromatography. The melt is then poured onto 3 kg of ice and the product is filtered off and washed neutral with water. The neutral paste obtained is brought to a volume of 5,000 ml with water, a solution of 2 kg of sodium sulphide monohydrate in 2,000 ml of water is added, and the batch is warmed to 95° C. in 1 hour and kept at 95° C. for 1 hour. The blue amorphous product is then filtered off, rinsed with hot water and dried, giving 75.6 g=68% of theory of 1,4,5,8-tetraamino-2,6-dimethyl-anthraquinone, which on recrystallization from aniline gives blue needles.

EXAMPLE 19c 50 g of 1,4,5-tetraamino-2,6-dimethyl-anthraquinone, 25 g of potassium carbonate, 10 ml of aniline and 350 ml of nitrobenzene are heated to the boil until the formation of the dialdehyde-anil has ended, according to thin layer chromatography. The melt is clarified at 160° C. and is allowed to cool. The product, which has crystallized in blue prisms, is filtered off, washed with methanol and dried, giving 44 g=55% of theory of 1,4,5,8-tetraamino-anthraquinone-2,6-di-(aldehyde-anil), which in the same nematic phase as in Example 1 exhibits a degree of order S of 0.74.

Hydrolysis of the dialdehyde-anil with concentrated sulphuric acid in the usual manner gives 1,4,5,8-tetraamino-anthraquinone-2,6-dialdehyde.

EXAMPLE 20

10 g of 1,4,5,8-tetraamino-anthraquinone-2,6-dialdehyde, 100 ml of glacial acetic acid and 8.7 g of p-toluidine are heated to the boil for 1 hour. When the mixture has cooled, the product, which has crystallized in blue prisms, is filtered off, washed with methanol and dried, giving 10.1 g=65% of theory of 1,4,5,8-tetraamino-anthraquinone-2,6-di-(aldehyde-4-methylanil), which, in the same nematic phase as in Example 1, exhibits a degree of order S of 0.82.

If, in Example 20, appropriate substituted anilines are used in place of p-toluidine, the dyestuffs shown in the table are obtained analogously:

| Example | Dyestuff | Degree of order S |
|---|---|---|
| 21 | 1,4,5,8-Tetraamino-anthraquinone-2,6-di-(aldehyde-4-cyclohexylanil) | 0.81 |
| 22 | 1,4,5,8-Tetraamino-anthraquinone-2,6-di-(aldehyde-4-tert.-butylanil) | 0.78 |
| 23 | 1,4,5,8-Tetraamino-anthraquinone-2,6-di-(aldehyde-2-methyl-4-tert.-butyl-anil) | 0.75 |
| 24 | 1,4,5,8-Tetraamino-anthraquinone-2,6-di-(aldehyde-4-isooctylanil) | 0.77 |
| 25 | 1,4,5,8-Tetraamino-anthraquinone-2,6-di-(aldehyde-3-methoxyanil) | 0.78 |
| 26 | 1,4,5,8-Tetraamino-anthraquinone-2,6-di-(aldehyde-4-$\beta$-hydroxyethoxy-anil) | 0.74 |
| 27 | 1,4,5,8-Tetraamino-anthraquinone-2,6-di-(aldehyde-2-chloranil) | 0.79 |
| 28 | 1,4,5,8-Tetraamino-anthraquinone-2,6-di-(aldehyde-2,6-dimethyl-4-ethyl-anil) | 0.81 |

EXAMPLE 29

10 g of 1,5-diamino-4,8-di-(4-cyclohexyl-phenylamino)-anthraquinone-2,6-dialdehyde, 100 ml of glacial acetic acid and 6 g of 4-ethylaniline are heated to the boil for 1 hour. When the mixture has cooled, the product which has crystallised in small blue needles is filtered off, washed with methanol and dried, giving 10.8 g=76% of theory of 1,5-diamino-4,8-di-(4-cyclohexylphenylamino)-anthraquinone-2,6-di-(aldehyde-4-ethylanil), which, in the same nematic phase as in Example 1, exhibits a degree of order S of 0.81.

EXAMPLE 30a 20 g of 1,5-diamino-2,6-dibromo-4,8-di-(p-tosylamino)-anthraquinone, 4.5 g of potassium carbonate and 6.6 g of thiophenol in 125 ml of dimethylformamide are heated for 3 hours at 120°–125° C. When the mixture has cooled, the product, which has crystallized in attractive blue needles, is filtered off, washed with dimethylformamide and methanol, extracted by stirring with water and dried, giving 19.5 g=90% of theory of 1,5-diamino-2,6-di-(phenylthio)-4,8-di-(p-tosylamino)-anthraquinone.

EXAMPLE 30b 11 g of the product obtained in Example 30a are stirred with 80 ml of concentrated sulphuric acid at 30°–35° C. for 1 hour. 20 ml of water are then slowly added dropwise at 15°–20° C. and the product, which has crystallised out in orange prisms, is filtered off, washed with a small amount of 80% strength sulphuric acid and stirred with ammoniacal hot water. The product, which has crystallized in blue prisms, is filtered off hot, washed with hot water and dried, giving 5.7 g=85% of theory of 1,4,5,8-tetraamino-3,6-di-(phenylthio)-anthraquinone, which is employed in the same nematic phase as in Example 1.

If, in Example 30a, appropriate substituted thiophenols are employed in place of thiophenol, hydrolysis, according to Example 30b, of the intermediates obtained gives the dyestuffs shown in the table:

| Example | Dyestuff |
|---|---|
| 31 | 1,4,5,8-Tetraamino-2,6-di-(4-methylphenyl-thio)-anthraquinone |
| 32 | 1,4,5,8-Tetraamino-2,6-di-(4-tert.-butyl-phenylthio)-anthraquinone |
| 33 | 1,4,5,8-Tetraamino-2,6-di-(4-chlorophenyl-thio)-anthraquinone |
| 34 | 1,4,5,8-Tetraamino-2,6-di-(3-methoxyphenyl-thio)-anthraquinone |

EXAMPLE 35a 20 g of 1,5-diamino-2,6-dibromo-4,8-di-(p-tosylamino)-anthraquinone, 4.5 g of potassium carbonate and 10 g of 2-mercaptobenzthiazole in 150 ml of dimethylformamide are heated for 3 hours at 125°–130° C. When the mixture has cooled, the product, which has crystallized out in blue prisms, is filtered off, washed with dimethylformamide and methanol, extracted by stirring with water and dried, giving 22.7 g=92% of theory of 1,5-diamino-2,6-di-(2-benzthiazolylthio)-4,8-di-(p-tosylamino)-anthraquinone.

EXAMPLE 35b 15 g of the product obtained in Example 30a are stirred for 1 hour with 120 ml of concentrated sulphuric acid at 30°–35° C. 30 ml of water are then slowly added dropwise at 15°–20° C. and the product, which has precipitated in prisms, is filtered off, washed with a small amount of 80% strength sulphuric acid and stirred with ammoniacal hot water. The product, which has crystallized in blue prisms, is filtered off hot, washed with hot water and dried, giving 10.8 g=82% of theory of 1,4,5,8-tetraamino-2,6-di-(2-benzthiazolylthio)anthraquinone, which is employed in the nematic phase according to Example 1.

The dyestuffs listed in the tables which follow can also be prepared analogously to the examples described above.

$$\text{[Structure: anthraquinone with } R_2\text{-NH, HN-(phenyl-cyclohexyl), Q substituents]}$$

| R₂ | Q | Degree of order S |
|---|---|---|
| 4-Cyclohexylphenyl | N—(4-Methylphenyl)-formimidoyl | 0.82 |
| " | N—(4-Dibenzofuran-2-yl)-formimidoyl | 0.82 |
| " | N—(4-Cyclohexylphenyl)-formimidoyl | 0.81 |
| " | Phenyl | 0.80 |
| " | N—(4-Phenylamino-phenyl)-formimidoyl | 0.80 |
| " | N—(4-Methoxyphenyl) | 0.79 |
| " | N—(4-Phenyl-thiazol-2-yl)-formimidoyl | 0.79 |
| " | N—(4-Methoxyphenyl)-formimidoyl | 0.78 |
| " | Phenethyloxy | 0.78 |
| " | Formyl | 0.77 |
| " | 1-Naphthyloxy | 0.77 |
| " | Phenoxycarbonyl | 0.76 |
| Amino | N—(4-Methylphenyl)-formimidoyl | 0.82 |
| " | N—(Dibenzofuran-2-yl)-formimidoyl | 0.82 |
| " | N—(4-Cyclohexylphenyl)-formimidoyl | 0.81 |
| " | Phenyl | 0.80 |
| " | N—(4-Phenylaminophenyl)-formimidoyl | 0.80 |
| " | 4-Methoxyphenyl | 0.79 |
| " | N—(4-Phenylthiazol-2-yl)-formimidoyl | 0.79 |
| " | N—(4-Methoxyphenyl)-formimidoyl | 0.78 |
| " | Phenethyloxy | 0.78 |
| " | Formyl | 0.77 |
| " | 1-Naphthyloxy | 0.77 |
| " | Phenoxycarbonyl | 0.76 |
| 4-Ethoxycarbonyl-phenyl | N—(4-Methylphenyl)-formimidoyl | 0.80 |
| 4-Ethoxycarbonyl-phenyl | N—(Dibenzofuran-2-yl)-formimidoyl | 0.80 |
| 4-Ethoxycarbonyl-phenyl | N—(4-Cyclohexylphenyl)-formimidoyl | 0.79 |
| 4-Ethoxycarbonyl-phenyl | Phenyl | 0.78 |
| 4-Ethoxycarbonyl-phenyl | N—(4-Phenylamino-phenyl)-formimidoyl | 0.78 |
| 4-Ethoxycarbonyl-phenyl | 4-Methoxyphenyl | 0.77 |
| 4-Ethoxycarbonyl-phenyl | N—(4-Phenyl-thiazol-2-yl)-formimidoyl | 0.76 |
| 4-Ethoxycarbonyl-phenyl | N—(4-Methoxyphenyl)-formimidoyl | 0.75 |
| 4-Methylphenyl | N—(4-Methylphenyl)-formimidoyl | 0.78 |
| " | N—(Dibenzofuran-2-yl)-formimidoyl | 0.78 |
| " | N—(4-Cyclohexylphenyl)-formimidoyl | 0.77 |
| " | Phenyl | 0.75 |
| 4-Ethylphenyl | N—(4-Methylphenyl)-formimidoyl | 0.78 |
| " | N—(Dibenzofuran-2-yl)-formimidoyl | 0.78 |
| Dimethylphenyl | N—(4-Methylphenyl)-formimidoyl | 0.78 |
| " | N—(Dibenzofuran-2-yl)-formimidoyl | 0.78 |
| " | N—(4-Cyclohexylphenyl)-formimidoyl | 0.76 |
| 4-Methoxyphenyl | N—(4-Methylphenyl)-formimidoyl | 0.77 |
| " | N—(Dibenzofuran-2-yl)-formimidoyl | 0.77 |
| " | N—(4-Cyclohexylphenyl)-formimidoyl | 0.76 |
| 2,6-Diethyl-4-methylphenyl | N—(4-Methylphenyl)-formimidoyl | 0.77 |
| 2,6-Diethyl-4-methylphenyl | N—(Dibenzofuran-2-yl)-formimidoyl | 0.77 |
| 2,6-Diethyl-4-methylphenyl | N—(4-Cyclohexylphenyl)-formimidoyl | 0.75 |
| 4-t.-butylphenyl | N—(4-Methylphenyl)-formimidoyl | 0.77 |
| " | N—(Dibenzofuran-2-yl)-formimidoyl | 0.77 |
| " | N—(4-Cyclohexylphenyl)-formimidoyl | 0.75 |
| Methyl | N—(4-Methylphenyl)-formimidoyl | 0.76 |
| " | N—(Dibenzofuran-2-yl)-formimidoyl | 0.76 |
| " | N—(4-Cyclohexylphenyl)-formimidoyl | 0.75 |
| i-Butyl | N—(4-Methylphenyl)-formimidoyl | 0.76 |
| " | N—(Dibenzofuran-2-yl)-formimidoyl | 0.76 |

$$\text{[Structure: anthraquinone with } H_2N, NH_2 \text{ and Q substituents]}$$

| Q | Degree of order S |
|---|---|
| N—(4-Methylphenyl)-formimidoyl | 0.82 |
| N—(Dibenzofuran-2-yl)-formimidoyl | 0.82 |
| N—(4-Cyclohexylphenyl)-formimidoyl | 0.81 |
| Phenyl | 0.80 |
| N—(4-Phenylamino-phenyl)-formimidoyl | 0.80 |
| 4-Methoxyphenyl | 0.79 |
| N—(4-Phenyl-thiazol-2-yl)-formimidoyl | 0.79 |
| N—(4-Methoxyphenyl)-formimidoyl | 0.78 |
| Phenethyloxy | 0.78 |
| Formyl | 0.77 |
| 1-Naphthyloxy | 0.77 |
| Phenoxycarbonyl | 0.76 |

$$\text{[Structure: anthraquinone with H}_5\text{C}_2\text{O-C(=O)-phenyl-NH, H}_2\text{N, HN-phenyl-C(=O)-OC}_2\text{H}_5\text{ and Q substituents]}$$

| Q | Degree of order S |
|---|---|
| N—(4-Methoxyphenyl)-formimidoyl | 0.80 |
| N—(Dibenzofuran-2-yl)-formimidoyl | 0.80 |
| N—(4-Cyclohexylphenyl)-formimidoyl | 0.79 |
| Phenyl | 0.78 |
| N—(4-Phenylamino-phenyl)-formimidoyl | 0.78 |
| 4-Methoxyphenyl | 0.77 |
| N—(4-Phenyl-thiazol-2-yl)-formimidoyl | 0.76 |
| N—(4-Methoxyphenyl)-formimidoyl | 0.75 |

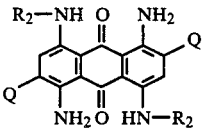

| $R_2$ | Q | Degree of order S |
|---|---|---|
| 4-Methylphenyl | N—(4-Methylphenyl)-formimidoyl | 0.78 |
| " | N—(Dibenzofuran-2-yl)-formimidoyl | 0.78 |
| " | N—(4-Cyclohexylphenyl)-formimidoyl | 0.77 |
| 4-Ethylphenyl | N—(4-Methylphenyl)-formimidoyl | 0.78 |
| " | N—(Dibenzofuran-2-yl)-formimidoyl | 0.78 |
| " | N—(Cyclohexylphenyl)-formimidoyl | 0.76 |
| Dimethylphenyl | N—(4-Methylphenyl)-formimidoyl | 0.77 |
| " | N—(Dibenzofuran-2-yl)-formimidoyl | 0.77 |
| " | N—(4-Cyclohexylphenyl)-formimidoyl | 0.76 |
| 4-Methoxyphenyl | N—(4-Methylphenyl)-formimidoyl | 0.77 |
| " | N—(Dibenzofuran-2-yl)-formimidoyl | 0.77 |
| " | N—(4-Cyclohexylphenyl)-formimidoyl | 0.76 |
| 2,6-Diethyl-4-methylphenyl | N—(4-Methylphenyl)-formimidoyl | 0.76 |
| 2,6-Diethyl-4-methylphenyl | N—(Dibenzofuran-2-yl)-formimidoyl | 0.76 |
| 2,6-Diethyl-4-methylphenyl | N—(4-Cyclohexylphenyl)-formimidoyl | 0.75 |
| 4-t.-Butylphenyl | N—(4-Methylphenyl)-formimidoyl | 0.76 |
| " | N—(Dibenzofuran-2-yl)-formimidoyl | 0.76 |
| " | N—(4-Cyclohexylphenyl)-formimidoyl | 0.75 |
| Methyl | N—(4-Methylphenyl)-formimidoyl | 0.76 |
| " | N—(Dibenzofuran-2-yl)-formimidoyl | 0.76 |
| i-Butyl | N—(4-Methylphenyl)-formimidoyl | 0.76 |
| " | N—(Dibenzofuran-2-yl)-formimidoyl | 0.76 |

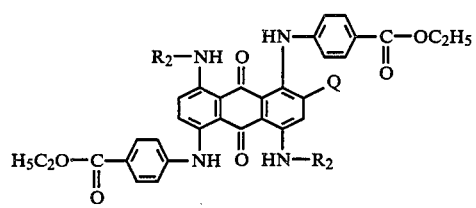

| $R_2$ | Q | Degree of order S |
|---|---|---|
| 4-Ethoxycarbonyl-phenyl | N—(4-Methylphenyl)-formimidoyl | 0.78 |
| 4-Ethoxycarbonyl-phenyl | N—(Dibenzofuran-2-yl)-formimidoyl | 0.78 |
| 4-Ethoxycarbonyl-phenyl | N—(4-Cyclohexylphenyl)-formimidoyl | 0.77 |
| 4-Methylphenyl | N—(4-Methylphenyl)-formimidoyl | 0.75 |
| " | N—(Dibenzofuranyl)-formimidoyl | 0.75 |

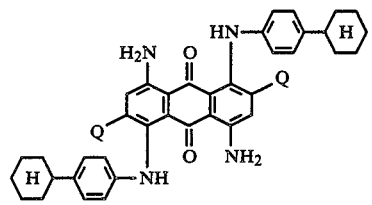

| Q | Degree of order S |
|---|---|
| 2-Chloro-phenoxy | 0.81 |
| 4-Methyl-phenoxy | 0.81 |
| 2-Ethoxy-phenoxy | 0.81 |
| 4-Methoxy-phenoxy | 0.81 |
| 4-($\beta$-Cyanoethyl-phenoxy) | 0.81 |
| 3-Chloro-phenoxy | 0.81 |
| 4-Phenyl-phenoxy | 0.81 |
| 3-Methyl-phenoxy | 0.81 |
| 4-Chloro-phenoxy | 0.80 |
| p-(2-Phenyl-prop-2-yl)-phenoxy | 0.80 |
| 2-Methyl-phenoxy | 0.80 |
| 2-Methoxy-phenoxy | 0.80 |
| 4-Methylthio-phenoxy | 0.80 |
| 4-t.-Butyl-phenoxy | 0.80 |
| 3-Methoxy-phenoxy | 0.80 |
| Phenoxy | 0.79 |
| 4-(4'-Hydroxyphenyl-amino-sulphonyl)-phenoxy | 0.79 |
| 2-Ethyl-phenoxy | 0.79 |
| 4-Hydroxy-phenoxy | 0.78 |
| 3-Cyano-phenoxy | 0.78 |
| 4-Phenylthio-phenoxy | 0.78 |
| 1,1,3,3-Tetramethylbut-1-yl-phenoxy | 0.77 |
| Cyclohexyl-phenoxy | 0.77 |
| 4-Phenylaminosulphonyl-phenoxy | 0.77 |
| 2-Chlorophenoxysulphonyl | 0.75 |

| Q | Degree of order S |
|---|---|
| 2-Chloro-phenoxy | 0.81 |
| 4-Methyl-phenoxy | 0.81 |
| 2-Ethoxy-phenoxy | 0.81 |
| 4-Methoxy-phenoxy | 0.81 |
| 4-($\beta$-Cyanoethyl)-phenoxy | 0.81 |
| 3-Chloro-phenoxy | 0.81 |
| 4-Phenyl-phenoxy | 0.81 |
| 3-Methyl-phenoxy | 0.81 |
| 4-Chloro-phenoxy | 0.80 |
| p-(2-Phenyl-prop-2-yl)-phenoxy | 0.80 |
| 2-Methyl-phenoxy | 0.80 |
| 2-Methoxy-phenoxy | 0.80 |
| 4-Methylthio-phenoxy | 0.80 |
| 4-t.Butyl-phenoxy | 0.80 |
| 3-Methoxy-phenoxy | 0.80 |
| Phenoxy | 0.79 |
| 4-(4'-Hydroxyphenyl-aminosulphonyl)-phenoxy | 0.79 |
| 2-Ethyl-phenoxy | 0.79 |
| 4-Hydroxy-phenoxy | 0.78 |
| 3-Cyano-phenoxy | 0.78 |
| 4-Phenylthio-phenoxy | 0.78 |
| 1,1,3,3-Tetramethylbut-1-yl-phenoxy | 0.77 |
| 4-Cyclohexyl-phenoxy | 0.77 |
| 4-Phenylaminosulphonyl-phenoxy | 0.77 |
| 2-Chlorophenoxysulphonyl | 0.75 |

-continued

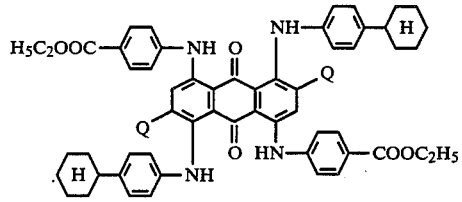

| Q | Degree of order S |
|---|---|
| 2-Chlorophenoxy | 0.80 |
| 4-Methyl-phenoxy | 0.79 |
| 2-Ethoxy-phenoxy | 0.79 |
| 4-Methoxy-phenoxy | 0.79 |
| 4-(β-Cyanoethyl)-phenoxy | 0.79 |
| 3-Chloro-phenoxy | 0.79 |
| 4-Phenyl-phenoxy | 0.79 |
| 3-Methyl-phenoxy | 0.79 |
| 4-Chloro-phenoxy | 0.78 |
| p-(2-Phenyl-prop-2-yl)-phenoxy | 0.78 |
| 2-Methyl-phenoxy | 0.78 |
| 2-Methoxy-phenoxy | 0.78 |
| 4-Methylthio-phenoxy | 0.78 |
| 4-t.-Butyl-phenoxy | 0.78 |
| 3-Methoxy-phenoxy | 0.78 |
| Phenoxy | 0.77 |
| 4-(4'-Hydroxyphenyl-aminosulphonyl)-phenoxy | 0.77 |
| 2-Ethyl-phenoxy | 0.76 |
| 4-Hydroxy-phenoxy | 0.76⅔ |
| 3-Cyano-phenoxy | 0.76 |
| 4-Phenylthio-phenoxy | 0.76 |

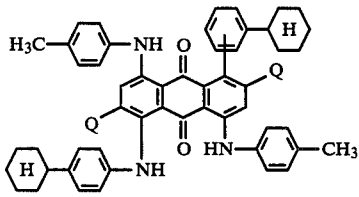

| Q | Degree of order S |
|---|---|
| 2-Chloro-phenoxy | 0.77 |
| 4-Methyl-phenoxy | 0.76 |
| 2-Ethoxy-phenoxy | 0.76 |
| 4-Methoxy-phenoxy | 0.76 |
| 4-(β-cyanoethyl)-phenoxy | 0.76 |
| 3-Chloro-phenoxy | 0.76 |
| 4-Phenyl-phenoxy | 0.76 |
| 3-Methyl-phenoxy | 0.76 |
| 4-Chloro-phenoxy | 0.76 |
| p-(2-Phenyl-prop-2-yl)-phenoxy | 0.75 |

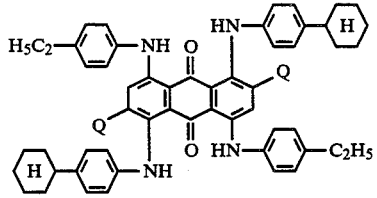

| Q | Degree of order S |
|---|---|
| 2-Chloro-phenoxy | 0.77 |
| 4-Methyl-phenoxy | 0.76 |
| 2-Ethoxy-phenoxy | 0.76 |
| 4-Methoxy-phenoxy | 0.76 |
| 4-(β-Cyanoethyl)-phenoxy | 0.76 |
| 3-Chloro-phenoxy | 0.75 |
| 4-Phenyl-phenoxy | 0.75 |
| 3-Methyl-phenoxy | 0.75 |
| 4-Chloro-phenoxy | 0.75 |

-continued

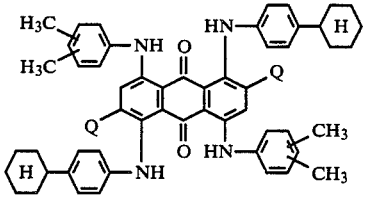

| Q | Degree of order S |
|---|---|
| 2-Chloro-phenoxy | 0.77 |
| 4-Methyl-phenoxy | 0.76 |
| 2-Ethoxy-phenoxy | 0.75 |
| 4-Methoxy-phenoxy | 0.75 |
| 4-(β-Cyanoethyl)-phenoxy | 0.75 |
| 3-Chloro-phenoxy | 0.75 |
| 4-Phenyl-phenoxy | 0.75 |
| 3-Methyl-phenoxy | 0.75 |

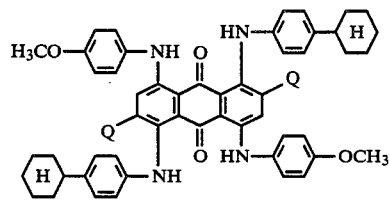

| Q | Degree of order S |
|---|---|
| 2-Chloro-phenoxy | 0.77 |
| 4-Methyl-phenoxy | 0.75 |
| 2-Ethoxy-phenoxy | 0.75 |
| 4-Methoxy-phenoxy | 0.75 |
| 4-(β-Cyanoethyl)-phenoxy | 0.75 |
| 3-Chloro-phenoxy | 0.75 |
| 4-Phenyl-phenoxy | 0.75 |

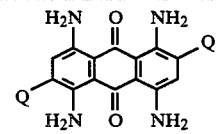

| Q | Degree of order S |
|---|---|
| 2-Chloro-phenoxy | 0.81 |
| 4-Methyl-phenoxy | 0.81 |
| 2-Ethoxy-phenoxy | 0.81 |
| 4-Methoxy-phenoxy | 0.81 |
| 4-(β-Cyanoethyl)-phenoxy | 0.81 |
| 3-Chloro-phenoxy | 0.81 |
| 4-Phenyl-phenoxy | 0.81 |
| 3-Methyl-phenoxy | 0.81 |
| 4-Chloro-phenoxy | 0.80 |
| p-(2-Phenylprop-2-yl)-phenoxy | 0.80 |
| 2-Methyl-phenoxy | 0.80 |
| 2-Methoxy-phenoxy | 0.80 |
| 4-Methylthio-phenoxy | 0.80 |
| 4-t.-Butyl-phenoxy | 0.80 |
| 3-Methoxy-phenoxy | 0.80 |
| Phenoxy | 0.79 |
| 4-(4'-Hydroxyphenyl-aminosulphonyl)-phenoxy | 0.79 |
| 2-Ethyl-phenoxy | 0.79 |
| 4-Hydroxy-phenoxy | 0.78 |
| 3-Cyano-phenoxy | 0.78 |
| 4-Phenylthio-phenoxy | 0.78 |
| 1,1,3,3-Tetramethylbut-1-yl-phenoxy | 0.77 |
| 4-Cyclohexyl-phenoxy | 0.77 |
| 4-Phenylaminosulphonyl-phenoxy | 0.77 |
| 2-Chlorophenoxy-sulphonyl | 0.75 |

-continued

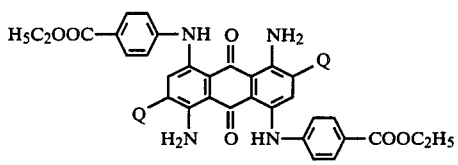

| Q | Degree of order S |
|---|---|
| 2-Chloro-phenoxy | 0.80 |
| 4-Methyl-phenoxy | 0.79 |
| 2-Ethoxy-phenoxy | 0.79 |
| 4-Methoxy-phenoxy | 0.79 |
| 4-(β-Cyanoethyl)-phenoxy | 0.79 |
| 3-Chloro-phenoxy | 0.79 |
| 4-Phenyl-phenoxy | 0.79 |
| 3-Methyl-phenoxy | 0.79 |
| 4-Chloro-phenoxy | 0.78 |
| p-(2-Phenylprop-2-yl)-phenoxy | 0.78 |
| 2-Methyl-phenoxy | 0.78 |
| 2-Methoxy-phenoxy | 0.78 |
| 4-Methylthio-phenoxy | 0.78 |
| 4-t.-Butyl-phenoxy | 0.78 |
| 3-Methoxy-phenoxy | 0.78 |
| Phenoxy | 0.77 |
| 4-(4'-Hydroxyphenyl-aminosulphonyl)-phenoxy | 0.77 |
| 2-Ethyl-phenoxy | 0.76 |
| 4-Hydroxy-phenoxy | 0.76 |
| 3-Cyano-phenoxy | 0.76 |
| 4-Phenylthio-phenoxy | 0.76 |

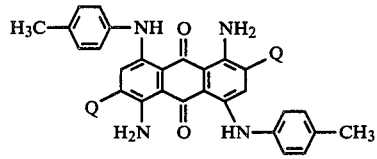

| Q | Degree of order S |
|---|---|
| 2-Chloro-phenoxy | 0.77 |
| 4-Methyl-phenoxy | 0.76 |
| 2-Ethoxy-phenoxy | 0.76 |
| 4-Methoxy-phenoxy | 0.76 |
| 4-(β-Cyanoethyl)-phenoxy | 0.76 |
| 3-Chloro-phenoxy | 0.76 |
| 4-Phenyl-phenoxy | 0.76 |
| 3-Methyl-phenoxy | 0.76 |
| 4-Chloro-phenoxy | 0.76 |
| p-(2-Phenylprop-2-yl)-phenoxy | 0.75 |

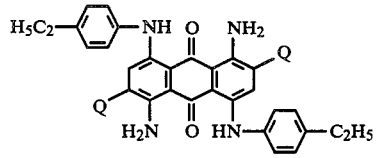

| Q | Degree of order S |
|---|---|
| 2-Chloro-phenoxy | 0.77 |
| 4-Methyl-phenoxy | 0.76 |
| 2-Ethoxy-phenoxy | 0.76 |
| 4-Methoxy-phenoxy | 0.76 |
| 4-(β-Cyanoethyl)-phenoxy | 0.76 |
| 3-Chloro-phenoxy | 0.75 |
| 4-Phenyl-phenoxy | 0.75 |
| 3-Methyl-phenoxy | 0.75 |
| 4-Chloro-phenoxy | 0.75 |

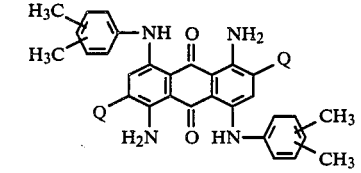

| Q | Degree of order S |
|---|---|
| 2-Chloro-phenoxy | 0.77 |
| 4-Methyl-phenoxy | 0.75 |
| 2-Ethoxy-phenoxy | 0.75 |
| 4-Methoxy-phenoxy | 0.75 |
| 4-(β-Cyanomethyl)-phenoxy | 0.75 |
| 3-Chloro-phenoxy | 0.75 |
| 4-Phenyl-phenoxy | 0.75 |
| 3-Methyl-phenoxy | 0.75 |

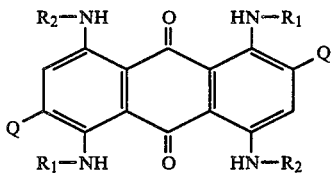

| Q | Degree of order S |
|---|---|
| 2-Chloro-phenoxy | 0.77 |
| 4-Methyl-phenoxy | 0.75 |
| 2-Ethoxy-phenoxy | 0.75 |
| 4-Methoxy-phenoxy | 0.75 |
| 4-(β-Cyanomethyl)-phenoxy | 0.75 |

We claim:
1. An anthraquinone dyestuff of the formula

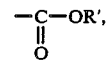

wherein
$R_1$, $R_2$ denote hydrogen; $C_1$–$C_6$-alkyl; $C_3$–$C_7$-cycloalkyl; unsubstituted phenyl; phenyl which is substituted by $C_1$–$C_4$-alkyl, cyclohexyl, $C_1$–$C_4$-alkoxy, ($C_1$–$C_4$-alkoxy)-carbonyl and ($C_1$–$C_4$-alkyl)-carbonyl; naphthyl; benzyl; phenethyl and
Q denotes an —OR', —SR', —CH=N—R', $$-\underset{\underset{O}{\|}}{C}-OR',$$

—CHO or —SO$_2$—O—R' radical, wherein
R' represents unsubstituted phenyl or phenyl which is substituted by $C_1$–$C_{10}$-alkyl, $C_1$–$C_6$-alkoxy, cyclohexyl, chlorine, bromine, cyano-$C_1$–$C_4$-alkyl, $C_1$–$C_4$-alkylthio, phenoxy, phenylthio, hydroxyl, cyano, mono- and di-$C_1$–$C_4$-alkylamino, phenylamino, mono- and di-$C_1$–$C_4$-alkylaminosulphonyl, phenylaminosulphonyl and hydroxyphenylaminosulphonyl; naphthyl; benzyl; phenethyl; an unsubstituted 5-membered or 6-membered heterocyclic ring, containing one to three heteroatoms from the group consisting of O, N and S, which ring can be substituted by $C_1$–$C_4$-alkyl or phenyl, and to which ring one or two benzene rings can be fused; such dyestuff excluding the formula in which $R_1$ and $R_2$ denote hydrogen and Q denotes phenoxy.

2. An anthraquinone dyestuff according to claim 1, of the formula

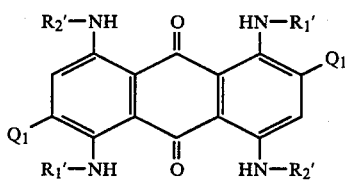

in which
- $R_1'$, $R_2'$ denote hydrogen, $C_1$–$C_4$-alkyl, or optionally cyclohexyl-, $C_1$–$C_4$-alkyl, $C_1$–$C_4$-alkoxy-, ($C_1$–$C_4$-alkoxy)-carbonyl- and ($C_1$–$C_4$-alkyl)-carbonyl-substituted phenyl and
- $Q_1$ denotes —OR', —SR', —CH=N—R',

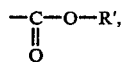

—CHO or SO$_2$—O—R', such dyestuff excluding the formula in which $R_1'$ and $R_2'$ denote hydrogen and $Q_1$ denotes phenoxy.

3. An anthraquinone dyestuff according to claim 1, in which
- $R_1$ and $R_2$ represent hydrogen, $C_1$–$C_4$-alkyl, or optionally cyclohexyl-, $C_1$–$C_4$-alkyl, $C_1$–$C_4$-alkoxy-, ($C_1$–$C_4$-alkyl)-carbonyl- and ($C_1$–$C_4$-alkoxy)-carbonyl-substituted phenyl.

4. An anthraquinone dyestuff according to claim 2, in which
- $R_1'$ and $R_2'$ denote hydrogen.

5. An anthraquinone dyestuff of the formula

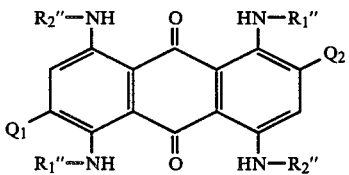

in which
- $R_1''$ and $R_2''$ denote hydrogen, 4-cyclohexylphen 4-methylphenyl, dimethylphenyl, ethylphenyl, 4-methoxyphenyl, 2,6-diethoxy-4-methylphenyl, 4-ethoxycarbonyl-phenyl and
- $Q_2$ denotes formyl, phenoxycarbonyl, phenoxy, 2-chlorophenoxy, 4-methylphenoxy, 2-ethoxyphenoxy, 4-methoxyphenoxy, 4-(β-cyanomethyl)-phenoxy, 3-chlorophenoxy, 4-phenylphenoxy, 3-methylphenoxy, 4-chlorophenoxy, p-(2-phenylprop-2-yl)-phenoxy, 2-methylphenoxy, 2-methoxyphenoxy, 4-methylthiophenoxy, 4-t.-butylphenoxy, 3-methoxyphenoxy, 4-(4'-hydroxyphenylaminosulphonyl)-phenoxy, 2-ethylphenoxy, 4-hydroxyphenoxy, 3-cyanophenoxy, 4-phenylthiophenoxy, 1,1,3,3-tetramethylbut-1-yl-phenoxy, cyclohexylphenyloxy, 4-phenylaminosulphonylphenoxy, 2-chlorophenoxysulphonyl, 1-naphthyloxy, phenoxy-carbonyl, phenethyloxy, N-(4-methylphenyl)-formimidoyl, N-(dibenzofuran-2-yl)-formimidoyl, N-(4-cyclothexylphenyl)-formimidoyl, N-(4-phenylamino-phenyl)-formimidoyl, N-(4-phenylthiazol-2-yl)-formimidoyl and N-(4-methoxyphenyl)-formimidoyl, such dyestuff excluding the formula in which $R_1'$ and $R_2'$ denote hydrogen and $Q_2$ denotes phenoxy.

6. An anthraquinone dyestuff of the formula

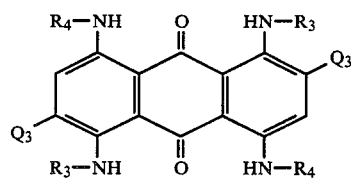

in which
- $R_3$ and $R_4$ denote hydrogen, optionally $C_1$–$C_4$-alkyl- or cyclohexyl-substituted phenyl or cyclohexyl, and
- $Q_3$ represents phenoxy or phenylthio, which can be substituted by $C_1$–$C_8$-alkyl, cyclohexyl, $C_1$–$C_4$-alkoxy, hydroxy-$C_1$–$C_4$-alkoxy, chlorine and bromine, or a formimidoyl radical which is optionally N-substituted by phenyl, $C_1$–$C_8$-alkylphenyl, cyclohexyl, $C_1$–$C_4$-alkoxyphenyl and (hydroxy-$C_1$–$C_4$-alkoxy)-phenyl, or represents a benzthiazolyl radical, such dyestuff excluding the formula in which $R_3$ and $R_4$ denote hydrogen and $Q_3$ denotes phenoxy.

7. A liquid-crystalline material having a positive dielectric anisotropy containing a dyestuff according to claim 10.

8. A liquid-crystalline material having a positive dielectric anisotropy containing 1,4,5,8-tetraamino-2-6-diphenoxy-anthraquinone.

9. A liquid-crystalline material having a positive dielectric anisotropy containing a dyestuff of the formula

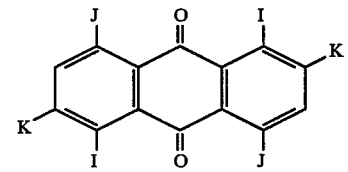

wherein I, J and K are selected so that the degree of order S is >0.74 in a liquid-crystalline material having positive dielectric anisotropy calculated from the formula $$S = \frac{e^y \times 0.85}{1 + e^y} \tag{A}$$

taking a base value of 0.95 for the case where I=J=K=hydrogen, to which base value are added the increments mentioned, taking into account the sign, the thus determined value y then being inserted in formula (A), from which, using the limiting condition S>0.74, the amount of the particularly preferred compounds is deduced, the possible meanings of the substituents being as follows:

| | Increment |
|---|---|
| I, J: | |

-continued

| Structure | Conditions | Increment |
|---|---|---|
| -NH-C6H4-C(O)OX | with X = n-C1-C4—alkyl | 0.05 |
| -NH-C6H3(X1)(X2)-X | with X = n-C1-C4—alkyl and X1 = X2 = H | -0.18 |
| | with X = X1 = n-C1-C4—alkyl and X2 = H | -0.26 |
| | with X = branched C1-C4—alkyl and X1 = X2 = H | -0.26 |
| -NH2 | | 0.24 |
| -HN-C6H4-C6H11 | | 0.24 |
| -HN-C6H4-OR | with R = n-C1-C4—alkyl | -0.20 |
| -HN-R | with R = n-C1-C4—alkyl | -0.26 |
| | with R = branched C1-C4—alkyl | -0.31 |

K:

| Structure | Increment |
|---|---|
| -CH=N-biphenyl-O (dibenzofuran) | 0.64 |
| -CH=N-C6H4-X | 0.65 |
| -CH=N-C6H4-C6H11 | 0.56 |
| -CH=N-C6H4-NH-C6H5 | 0.40 |
| -CH=N-C6H4-OX | 0.28 |
| -CH=N-(4-phenylthiazoline) | 0.32 |

-continued

| Structure | Increment |
|---|---|
| -CO2-C6H4-X | 0.08 |
| -O-C6H4-X | 0.36 |
| -O-(CH2)2-C6H4-X | 0.20 |
| -O-naphthyl | 0.16 |
| -CHO | 0.20 |

10. A liquid-crystalline material having a positive dielectric anisotropy containing a dyestuff according to claim 3.

11. A liquid-crystalline material having a positive dielectric anisotropy containing a dyestuff according to claim 5.

12. A liquid-crystalline material having a positive dielectric anisotropy containing a dyestuff according to claim 6.

13. A liquid-crystalline material according to claim 7 which further comprises mixtures of two or more of alkylcyanobiphenyls, alkoxycyanobiphenyls, alkylcyanoterphenyls, phenylcyclohexane, bicyclohexyls, azoxy compounds, Schiff bases, phenyl benzoates, phenyl thiobenzoates and terpyrimidines.

14. A liquid-crystalline material according to claim 7, wherein said material has positive dielectric anisotropy.

15. An anthraquinone dyestuff according to claim 1, wherein said dyestuff is of the formula

16. An anthraquinone dyestuff according to claim 1, wherein said dyestuff is of the formula

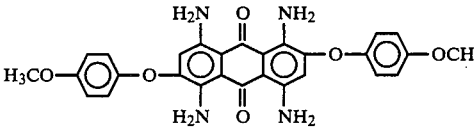

17. A liquid-crystalline material having a positive dielectric anisotropy, wherein the dyestuff is of the formula in claim 15.

18. A liquid-crystalline material having a positive dielectric anisotropy, wherein the dyestuff is of the formula in claim 16.

19. An anthraquinone dyestuff according to claim 1, wherein said dyestuff is selected from the group consisting of 1,4,5,8-Tetraamino-2,6-(4-tert.-butylphenoxy)anthraquinone;
1,4,5,8-Tetraamino-2,6-(4-cyclohexylphenoxy)anthraquinone;
1,4,5,8-Tetraamino-2,6-(2-methoxyphenoxy)anthraquinone;
1,4,5,8-Tetraamino-2,6-(4-n-butoxyphenoxy)anthraquinone;
1,4,5,8-Tetraamino-2,6-(4-$\beta$-hydroxyethoxyphenoxy)anthraquinone;
1,4,5,8-Tetraamino-2,6-(4-chlorophenoxy)anthraquinone;
1,4,5,8-Tetraamino-2,6-(3-bromophenoxy)anthraquinone;
1,4,5,8-Tetra-(4-cyclohexylphenylamino)-2,6-di(4-methylphenoxyanthraquinone);
1,4,5,8-Tetra-(4-cyclohexylphenylamino)-2,6-di(4-tert.-butylphenoxy)-anthraquinone;
1,4,5,8-Tetra-(4-cyclohexylphenylamino)-2,6-di(3-methoxyphenoxy)-anthraquinone;
1,5-Di-(p-toluidino)-4,8-di-(4-cyclohexylphenylamino)-2,6-di-(4-tert.-butylphenoxy)anthraquinone;
1,5-Di-(p-toluidino)-4,8-di-(4-cyclohexylphenylamino)-2,6-di-(4-n-propoxyphenoxy)-anthraquinone;
1,5-Di-(p-toluidino)-4,8-(cyclohexylphenylamino)-2,6-di-(2-chlorophenoxy)-anthraquinone;
1,4,5,8-Tetraamino-2,6-di-(4-methylphenylthio)anthraquinone;
1,4,5,8-Tetraamino-2,6-di-(4-tert.-butylphenylthio)-anthraquinone;
1,4,5,8-Tetraamino-2,6-di-(4-chlorophenylthio)anthraquinone; and
1,4,5,8-Tetraamino-2,6-di-(3-methoxyphenylthio)anthraquinone.

20. A liquid-crystalline material having a positive dielectric anisotropy, wherein the dyestuff is as defined in claim 19.

21. An anthraquinone dyestuff of the formula

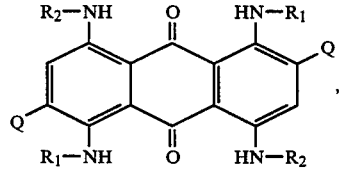

wherein $R_1$, $R_2$ and Q are defined below:

| $R_1$ | $R_2$ | Q |
|---|---|---|
| 4-Cyclohexylphenyl | 2,6-Diethyl-4-methylphenyl | 2-Chlorophenoxy |
| " | 4-t.-Butylphenyl | 2-Chlorophenoxy |
| " | Methyl | 2-Chlorophenoxy |
| Amino | 2,6-Diethyl-4-methylphenyl | 2-Chlorophenoxy |
| " | 4-t.-Butylphenyl | 2-Chlorophenoxy |
| H₅C₂OOC—⟨phenyl⟩— | —⟨phenyl⟩—COOC₂H₅ | 2-Chloro-phenoxy |
| " | " | 4-Methyl-phenoxy |
| " | " | 2-Ethoxy-phenoxy |
| " | " | 4-Methoxy-phenoxy |
| " | " | 4-($\beta$-Cyanoethyl)-phenoxy |
| " | " | 3-Chloro-phenoxy |
| " | " | 4-Phenyl-phenoxy |
| " | " | 3-Methyl-phenoxy |
| H₅C₂OOC—⟨phenyl⟩ | " | 4-Chloro-phenoxy |
| " | " | p-(2-Phenyl-prop-2-yl)-phenoxy |
| —⟨phenyl-cyclohexyl⟩ | —⟨phenyl-cyclohexyl⟩ | 2-Chloro-phenoxy |
| " | " | 4-Methyl-phenoxy |
| " | " | 2-Ethoxy-phenoxy |
| " | " | 4-Methoxy-phenoxy |
| " | " | 4-($\beta$-Cyanoethyl)-phenoxy |
| " | " | 3-Chloro-phenoxy |
| " | " | 4-Phenyl-phenoxy |
| " | " | 3-Methyl-phenoxy |
| " | " | 4-Chloro-phenoxy |
| " | " | p-(2-Phenyl-prop-2-yl)-phenoxy |

| R₁ | R₂ | Q |
|---|---|---|
| " | " | 2-Methyl-phenoxy |
| " | " | 2-Methoxy-phenoxy |
| " | " | 4-Methylthio-phenoxy |
| " | " | 4-t.-Butyl-phenoxy |
| " | " | 3-Methoxy-phenoxy |
| " | " | Phenoxy |
| " | " | 4-(4'-Hydroxyphenyl-amino-sulphonyl)-phenoxy |
| " | " | 2-Ethyl-phenoxy |
| " | " | 4-Hydroxy-phenoxy |
| " | " | 3-Cyano-phenoxy |
| " | " | 4-Phenylthio-phenoxy |
| " | " | 1,1,3,3-Tetramethyl-but-1-yl-phenoxy |
| " | " | Cyclohexyl-phenoxy |
| " | " | 4-Phenylamino-sulphonyl-phenoxy |
| " | " | 2-Chlorophenoxy-sulphonyl |
| 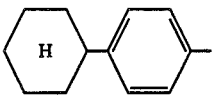 | 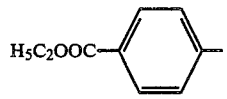 | 2-Chlorophenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| " | " | 3-Methyl-phenoxy |
| " | " | 4-Chloro-phenoxy |
| " | " | p-(2-Phenyl-prop-2-yl)-phenoxy |
| " | " | 2-Methyl-phenoxy |
| " | " | 2-Methoxy-phenoxy |
| 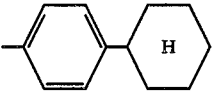 | " | 4-Methylthio-phenoxy |
| " | " | 4-t.-Butyl-phenoxy |
| " | " | 3-Methoxy-phenoxy |
| " | " | Phenoxy |
| " | " | 4-(4'-Hydroxyphenyl-aminosulphonyl)-phenoxy |
| " | " | 2-Ethyl-phenoxy |
| " | " | 4-Hydroxy-phenoxy |
| " | " | 3-Cyano-phenoxy |
| " | " | 4-Phenylthio-phenoxy |
|  | 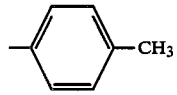 | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| " | " | 3-Methyl-phenoxy |
| " | " | 4-Chloro-phenoxy |
| " | " | p-(2-Phenyl-prop-2-yl)-phenoxy |
| " | 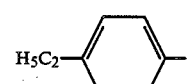 | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| 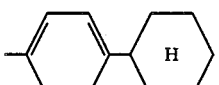 | " | 3-Chloro-phenoxy |

-continued

| R₁ | R₂ | Q |
|---|---|---|
| " | " | 4-Phenyl-phenoxy |
| " | " | 3-Methyl-phenoxy |
| " | " | 4-Chloro-phenoxy |
| 4-Cyclohexyl-phenyl | 3,5-Dimethyl-phenyl | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| " | " | 3-Methyl-phenoxy |
| " | 4-Methoxy-phenyl | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| 4-Ethoxycarbonyl-phenyl | 4-Ethoxycarbonyl-phenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-Methylphenyl | N—(4-Methylphenyl)-formimidoyl |
| " | " | N—(Dibenzofuran-2-yl)-formimidoyl |
| H | 4-Ethoxycarbonyl-phenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | " | Phenyl |
| " | " | N—(4-Phenylamino-phenyl)-formimidoyl |
| " | " | 4-Methoxyphenyl |
| " | " | N—(4-Phenyl-thiazol-2-yl)-formimidoyl |
| " | " | N—(4-Methoxyphenyl)-formimidoyl |
| 4-Cyclohexyl-phenyl | H | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| " | " | 3-Methyl-phenoxy |
| " | " | 4-Chloro-phenoxy |
| " | " | p-(2-Phenyl-prop-2-yl)-phenoxy |
| " | " | 2-Methyl-phenoxy |
| " | " | 2-Methoxy-phenoxy |

-continued

| R₁ | R₂ | Q |
|---|---|---|
| ″ | ″ | 4-Methylthio-phenoxy |
| ″ | ″ | 4-t.-Butyl-phenoxy |
| ″ | ″ | 3-Methoxy-phenoxy |
| ″ | ″ | Phenoxy |
| ″ | ″ | 4-(4′-Hydroxyphenyl-aminosulphonyl)-phenoxy |
| ″ | ″ | 2-Ethyl-phenoxy |
| ″ | ″ | 4-Hydroxy-phenoxy |
| ″ | ″ | 3-Cyano-phenoxy |
| ″ | ″ | 4-Phenylthio-phenoxy |
| ″ | ″ | 1,1,3,3-Tetramethyl-but-1-yl-phenoxy |
| ″ | ″ | 4-Cyclohexyl-phenoxy |
| ″ | ″ | 4-Phenylamino-sulphonyl-phenoxy |
| ″ | ″ | 2-Chlorophenoxy-sulphonyl |
| H | H₅C₂OOC—⟨phenyl⟩ | 3-Chloro-phenoxy |
| ″ | ″ | 4-Phenyl-phenoxy |
| ″ | ″ | 3-Methyl-phenoxy |
| ″ | ″ | 4-Chloro-phenoxy |
| ″ | ″ | p-(2-Phenyl-prop-2-yl)-phenoxy |
| ″ | ″ | 2-Methyl-phenoxy |
| ″ | ″ | 2-Methoxy-phenoxy |
| ″ | ″ | 4-Methylthio-phenoxy |
| ″ | ″ | 4-t.-Butyl-phenoxy |
| ″ | ″ | 3-Methoxy-phenoxy |
| ″ | ″ | Phenoxy |
| ″ | ″ | 4-(4′-Hydroxyphenyl-aminosulphonyl)-phenoxy |
| ″ | ″ | 2-Ethyl-phenoxy |
| ″ | ″ | 4-Hydroxy-phenoxy |
| ″ | ″ | 3-Cyano-phenoxy |
| ″ | ″ | 4-Phenylthio-phenoxy |
| ″ | —⟨phenyl⟩—CH₃ | 2-Chloro-phenoxy |
| ″ | ″ | 4-Methyl-phenoxy |
| ″ | —⟨phenyl⟩—CH₃ | 2-Ethoxy-phenoxy |
| ″ | —⟨phenyl⟩—CH₃ | 4-Methoxy-phenoxy |
| ″ | ″ | 4-(β-Cyanoethyl)-phenoxy |
| ″ | ″ | 3-Chloro-phenoxy |
| ″ | ″ | 4-Phenyl-phenoxy |
| ″ | ″ | 3-Methyl-phenoxy |
| ″ | ″ | 4-Chloro-phenoxy |
| ″ | —CH₃ | p-(2-Phenyl-prop-2-yl)-phenoxy |
| ″ | H₅C₂—⟨phenyl⟩— | 2-Chloro-phenoxy |
| ″ | ″ | 4-Methyl-phenoxy |
| ″ | ″ | 2-Ethoxy-phenoxy |
| ″ | ″ | 4-Methoxy-phenoxy |
| ″ | ″ | 4-(β-Cyanoethyl)-phenoxy |
| ″ | ″ | 3-Chloro-phenoxy |
| ″ | ″ | 4-Phenyl-phenoxy |
| ″ | ″ | 3-Methyl-phenoxy |
| ″ | ″ | 4-Chloro-phenoxy |

-continued

| R₁ | R₂ | Q |
|---|---|---|
| " | 2,5-dimethylphenyl (CH₃ groups at 2,5 positions) | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanomethyl)-phenoxy |
| " | " | 3-Chloro-phenoxy |
| " | " | 4-Phenyl-phenoxy |
| " | " | 3-Methyl-phenoxy |
| " | 4-methoxyphenyl (H₃CO-phenyl) | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanomethyl)-phenoxy |
| " | H | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | " | Phenyl |
| " | " | N—(4-Phenylamino-phenyl)-formimidoyl |
| " | " | 4-Methoxyphenyl |
| " | " | N—(4-Phenyl-thiazol-2-yl)-formimidoyl |
| " | " | N—(4-Methoxyphenyl)-formimidoyl |
| " | " | Phenethyloxy |
| " | " | Formyl |
| " | " | 1-Naphthyloxy |
| " | " | Phenoxycarbonyl |
| " | " | 2-Chloro-phenoxy |
| " | " | 4-Methyl-phenoxy |
| " | " | 2-Ethoxy-phenoxy |
| " | " | 4-Methoxy-phenoxy |
| " | " | 4-(β-Cyanoethyl)-phenoxy |
| " | " | 3-Chloro-phenoxy |
| " | " | 4-Phenyl-phenoxy |
| " | " | 3-Methyl-phenoxy |
| " | " | 4-Chloro-phenoxy |
| " | " | p-(2-Phenylprop-2-yl)-phenoxy |
| " | " | 2-Methyl-phenoxy |
| " | " | 2-Methoxy-phenoxy |
| " | " | 4-Methylthio-phenoxy |
| " | " | 4-t.-Butyl-phenoxy |
| " | " | 3-Methoxy-phenoxy |
| " | " | 4-(4'-Hydroxyphenyl-aminosulphonyl)-phenoxy |
| " | " | 2-Ethyl-phenoxy |
| " | " | 4-Hydroxy-phenoxy |
| " | " | 3-Cyano-phenoxy |
| " | " | 4-Phenylthio-phenoxy |
| " | " | 1,1,3,3-Tetramethyl-but-1-yl-phenoxy |
| " | " | 4-Cyclohexyl-phenoxy |
| " | " | 4-Phenylamino-sulphonyl-phenoxy |
| " | " | 2-Chlorophenoxy-sulphonyl |
| " | 4-Methylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-Ethylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | Dimethylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-Methoxyphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 2,6-Diethyl-4-methylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-t.-Butylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | Methyl | N—(4-Methylphenyl)-formimidoyl |

-continued

| $R_1$ | $R_2$ | Q |
|---|---|---|
| " | " | N—(Dibenzofuran-2-yl)-formimidoyl |
| " | i-Butyl | N—(4-Methylphenyl)-formimidoyl |
| " | " | N—(Dibenzofuran-2-yl)-formimidoyl |
| 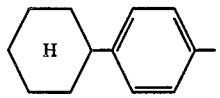 | 4-Cyclohexylphenyl | N—(4-Methylphenyl)-formimidoyl |
| " | " | N—(4-Dibenzofuran-2-yl)-formimidoyl |
| " | " | N—(4-Cyclohexyl-phenyl)-formimidoyl |
| " | " | Phenyl |
| " | " | N—(4-Phenylamino-phenyl)-formimidoyl |
| " | " | N—(4-Methoxyphenyl) |
| " | " | N—(4-Phenyl-thiazol-2-yl)-formimidoyl |
| " | " | N—(4-Methylphenyl)-formimidoyl |
| " | " | Phenethyloxy |
| " | " | Formyl |
| " | " | 1-Naphthyloxy |
| " | " | Phenoxycarbonyl |
| " | Amino | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | " | Phenyl |
| " | " | N—(4-Phenylamino-phenyl)-formimidoyl |
| " | " | 4-Methoxyphenyl |
| " | " | N—(4-Phenylthiazol-2-yl)-formimidoyl |
| " | " | N—(4-Methoxyphenyl)-formimidoyl |
| " | " | Phenethyloxy |
| " | " | Formyl |
| " | " | 1-Naphthyloxy |
| " | " | Phenoxycarbonyl |
| " | 4-Ethoxycarbonylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | " | Phenyl |
| " | " | N—(4-Phenylamino-phenyl)-formimidoyl |
| " | " | 4-Methoxyphenyl |
| " | " | N—(4-Phenyl-thiazol-2-yl)-formimidoyl |
| " | " | N—(4-Methoxyphenyl)-formimidoyl |
| " | 4-Methylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | " | Phenyl |
| " | 4-Ethylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | Dimethylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-Methoxyphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 2,6-Diethyl-4-methylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | 4-t.-butylphenyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | Methyl | N—(4-Methylphenyl)-formimidoyl |
| " | " | N—(Dibenzofuran-2-yl)-formimidoyl |
| " | " | N—(4-Cyclohexyl-phenyl)-formimidoyl |
| " | i-Butyl | N—(4-Methylphenyl)-formimidoyl |
| " | " | N—(Dibenzofuran-2-yl)-formimidoyl. |

22. A liquid-crystalline material, wherein the dyestuff is as defined in claim 21.

* * * * *

UNITED STATES PATENT AND TRADEMARK OFFICE
CERTIFICATE OF CORRECTION

PATENT NO. : 4,585,574

DATED : April 29, 1986

INVENTOR(S) : Martin Blunck, et al.

It is certified that error appears in the above-identified patent and that said Letters Patent is hereby corrected as shown below:

| | |
|---|---|
| Title Page, No. "[75] Inventors", line 1 | Delete "Uwer" and substitute --Uwe-- |
| Title Page, under "U.S. Patent Documents" | Line 1, delete "Cagnard" and substitute --Cognard--; Line 2, delete "Morimaka" and substitute --Morinaka-- |
| Title Page, under "Foreign Patent Documents", Line 16 | Delete "12/1981" and substitute --10/1981-- |
| Col. 1, lines 51, 52 | Delete "benzyloxy" and substitute --benzoyloxy-- |
| Col. 5, line 32 | Delete "prepared" and substitute --preferred-- |
| Col. 11, line 12 | After "1,4,5," insert --8-- |
| Col. 12, line 27 | Delete "3,6" and substitute --2,6-- |
| Col. 14, line 61 | Delete "(4-Methoxyphenyl)" and substitute --(4-Methylphenyl)-- |
| Col. 15, line 20 | Line 11 under "Q" insert --4- -- before "Cyclohexylphenyl" |
| Col. 16, line 34 | After "Cyclohexyl-phenoxy" delete "0.77" and insert --0.77-- under column "Degree of order S", line 23 |
| Col. 17, line 32 | Delete "upper right of formula and substitute 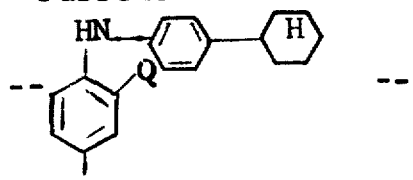 -- |

UNITED STATES PATENT AND TRADEMARK OFFICE
CERTIFICATE OF CORRECTION

PATENT NO. : 4,585,574
DATED : April 29, 1986
INVENTOR(S) : Martin Blunck, et al.

It is certified that error appears in the above-identified patent and that said Letters Patent is hereby corrected as shown below:

Col. 20, line 16    Delete lower left of formula and substitute

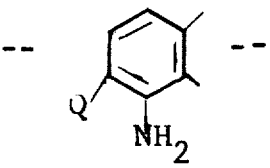

Col. 20, line 24    Insert omitted page 34 of specification as follows:

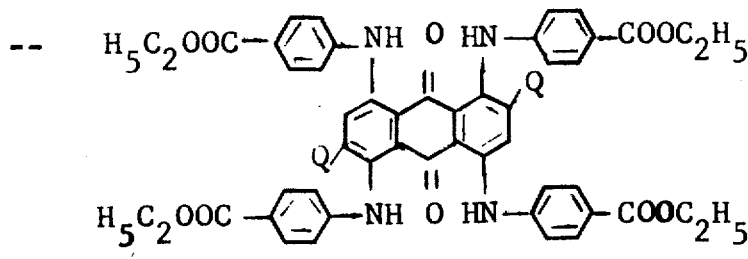

| Q | Degree of order S |
|---|---|
| 2-Chloro-phenoxy | 0.77 |
| 4-Methyl-phenoxy | 0.76 |
| 2-Ethoxy-phenoxy | 0.76 |
| 4-Methoxy-phenoxy | 0.76 |
| 4-(ß-Cyanoethyl)-phenoxy | 0.76 |
| 3-Chloro-phenoxy | 0.76 |
| 4-Phenyl-phenoxy | 0.76 |
| 3-Methyl-phenoxy | 0.76 |
| 4-Chloro-phenoxy | 0.76 |
| p-(2-Phenylprop-2-yl)-phenoxy | 0.75 |

UNITED STATES PATENT AND TRADEMARK OFFICE
CERTIFICATE OF CORRECTION

PATENT NO. : 4,585,574

DATED : April 29, 1986

INVENTOR(S) : Martin Blunck, et al.

Page 3 of 4

It is certified that error appears in the above-identified patent and that said Letters Patent is hereby corrected as shown below:

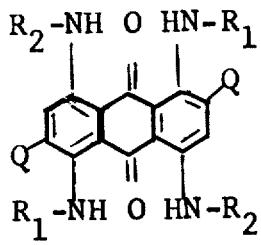

| $R_1$ | $R_2$ | Q | Degree of order S |
|---|---|---|---|
| 4-Cyclohexyl-phenyl | 2,6-Diethyl-methyl-phenyl | 2-Chloro-phenoxy | 0.76 |
| " | 4-t.-Butylphenyl | " | 0.76 |
| " | Methyl | " | 0.75 |
| Amino | 2,6-Diethyl-4-methyl-phenyl | " | 0.76 |
| " | 4-t.-Butylphenyl | " | 0.75 |

Col. 21, line 40 — Left side of formula delete "$Q_1$" and substitute --$Q_2$--

Col. 21, line 45 and Col. 22, lines 1 and 2 — Delete "$R_1$'" and "$R_2$'" and substitute --$R_1$"-- and $R_2$"--

Col. 21 line 45 — Correct spelling of --cyclohexyl-phenyl--

UNITED STATES PATENT AND TRADEMARK OFFICE
CERTIFICATE OF CORRECTION

PATENT NO. : 4,585,574

DATED : April 29, 1986

INVENTOR(S) : Martin Blunck, et al.

It is certified that error appears in the above-identified patent and that said Letters Patent is hereby corrected as shown below:

Col. 22, line 30          Delete "claim 10" and substitute --claim 1--

Signed and Sealed this

Eleventh Day of November, 1986

*Attest:*

DONALD J. QUIGG

*Attesting Officer*         *Commissioner of Patents and Trademarks*